United States Patent Office 3,565,526
Patented Feb. 23, 1971

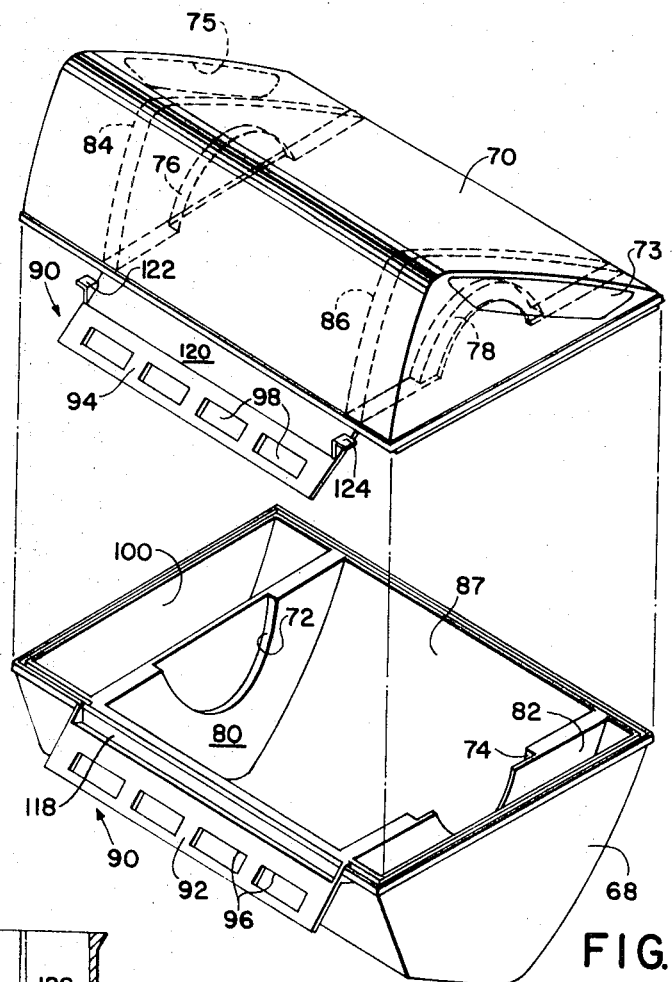
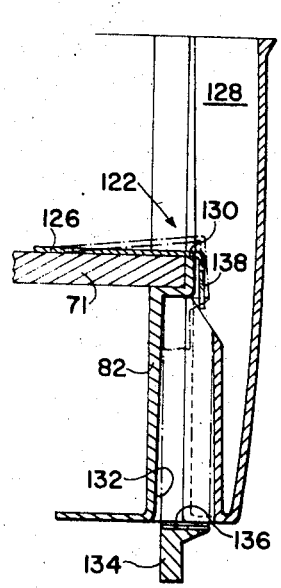

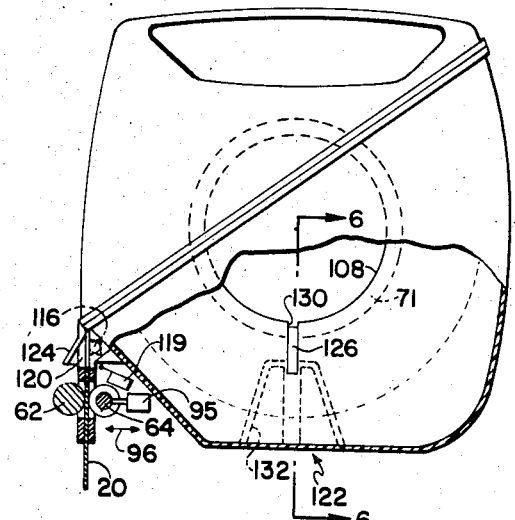
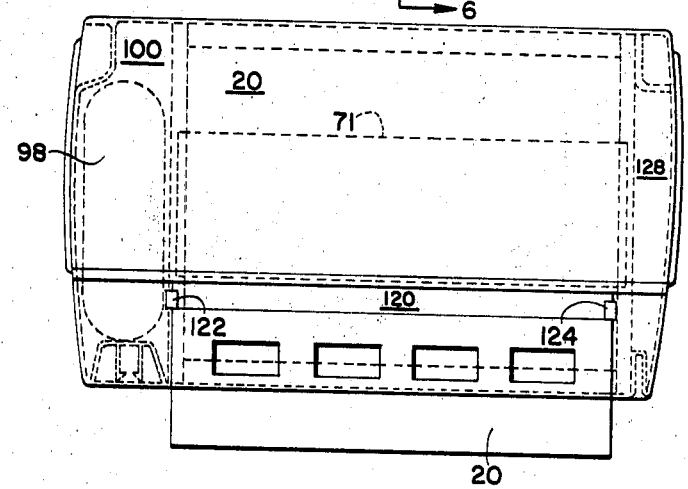
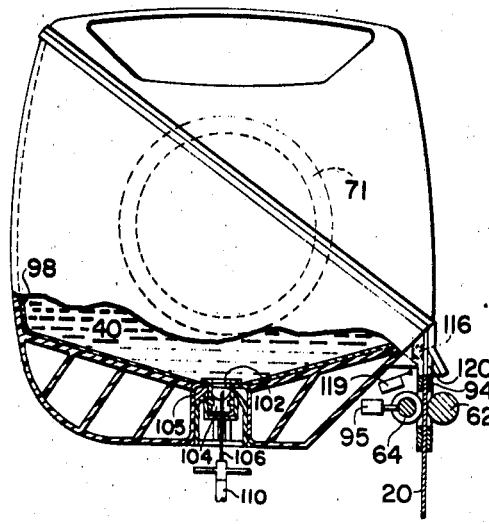

3,565,526
CASSETTE FOR A COPYING MACHINE
Dirk A. van Gemeren, Winchester, Mass., assignor to Polaroid Corporation, Cambridge, Mass., a corporation of Delaware
Filed Oct. 1, 1968, Ser. No. 764,086
Int. Cl. G03b 27/32
U.S. Cl. 355—27
14 Claims

ABSTRACT OF THE DISCLOSURE

A cassette containing coiled sheet material for a photographic document copier includes, at the coil exit opening, protruding lips having several openings through which drive rollers on the copier contact the material to deliver it from cassette. The cassette may also include a lock to prevent the coil end from slipping back into the cassette, and a container of processing liquid.

---

The present invention is directed to a cassette or container for photographic image-recording sheet material for use in document coyping apparatus, particularly of the type wherein the sheet material is coiled within the cassette and sheet feeding means on the copier may engage the end of the sheet for the purpose of feeding the sheet into the copier for use therein. Successive areas of the sheet are exposed within the copier and a liquid is applied to the surface of the exposed area to effect visible image formation thereon by a diffusion transfer process.

The cassette of the type comprehended by the present invention has a multiple of uses. For example, it is used not only as a device by which recording sheet material may be fed into a document copier but is also used as a container in which the coiled sheet material may be supplied to the user. Furthermore, a compartment may be provided therein wherein a liquid may be contained which is used in the copier to process the sheet material.

The cassette or container, in general, includes first and second sections which are sealed together after the coiled recording material is placed inside. The recording material is coiled around a core and support means inside the container receive the core for rotation therein. Extending from the container are feed lip means which are engaged by the feed means of the copier when the container is in feeding position. As the elongated sheet of recording material is fed from the coiled state, it passes out through these lip means where it is engaged by the copier sheet feed means which may comprise, for example, a pair of feed rollers of which at least one is driven. The pair of rollers engage the recording material through openings provided in the feed lip means of the container. By merely inserting the feed lip means between the feed rollers the container will be properly aligned in feeding position and the end of the coil of recording material is also automatically and simply placed in proper feeding position with respect to the feed rollers.

Other structure of the container includes means for preventing the uncoiling of the sheet material within the container during shipment or storage, which includes means to lock the core means within the container to prevent its rotation. Additional braking means hold the end of the recording material in position in the feed lip means to prevent the end from slipping back into the interior of the container body portion. Also included is a means to hermetically seal the container to prevent contamination and provide a longer shelf life. A portion of the cassette, as mentioned, may be set aside as a compartment containing the processing fluid for use in the copier. The fluid is preferably contained within a flexible receptacle which is collapsible as it is emptied of a fluid and the fluid may flow from the receptacle into a reservoir within the document copier.

Accordingly, it is an object of this invention to provide a cassette for a photographic document copier which serves as a container for supplying recording sheet material to the user and has means cooperating with feed means on the copier for feeding the recording material in the required amounts into the document copier for recording use.

It is another object of this invention to provide a cassette or container for a photographic document copier having processing liquid receptacle means within the cassette whereby the liquid may be removed therefrom for use within the copier.

Other objects of the invention will in part be obvious and will in part appear hereinafter.

The invention accordingly comprises the apparatus possessing the features, properties and the relation of components which are exemplified in the following detailed disclosure, and the scope of the application of which will be indicated in the claims.

For a fuller understandng of the nature and objects of the invention, reference should be had to the following detailed description taken in connection with the accompanying drawings wherein:

FIG. 2 is an exploded perspective view of the cassette of FIG. 1;

FIG. 3 is an elevational view of the cassette;

FIG. 4 is a partially sectionad, side elevational view of the cassette with a schematic representation of both the sheet material and liquid feeding means of the copier in cooperative relationship with said container;

FIG. 5 is a partially sectioned, elevational side view of the cassette; and

FIG. 6 is a fragmentary cross-sectional view of the cassette taken substantially along the line 6—6 of FIG. 5.

Figure 1:
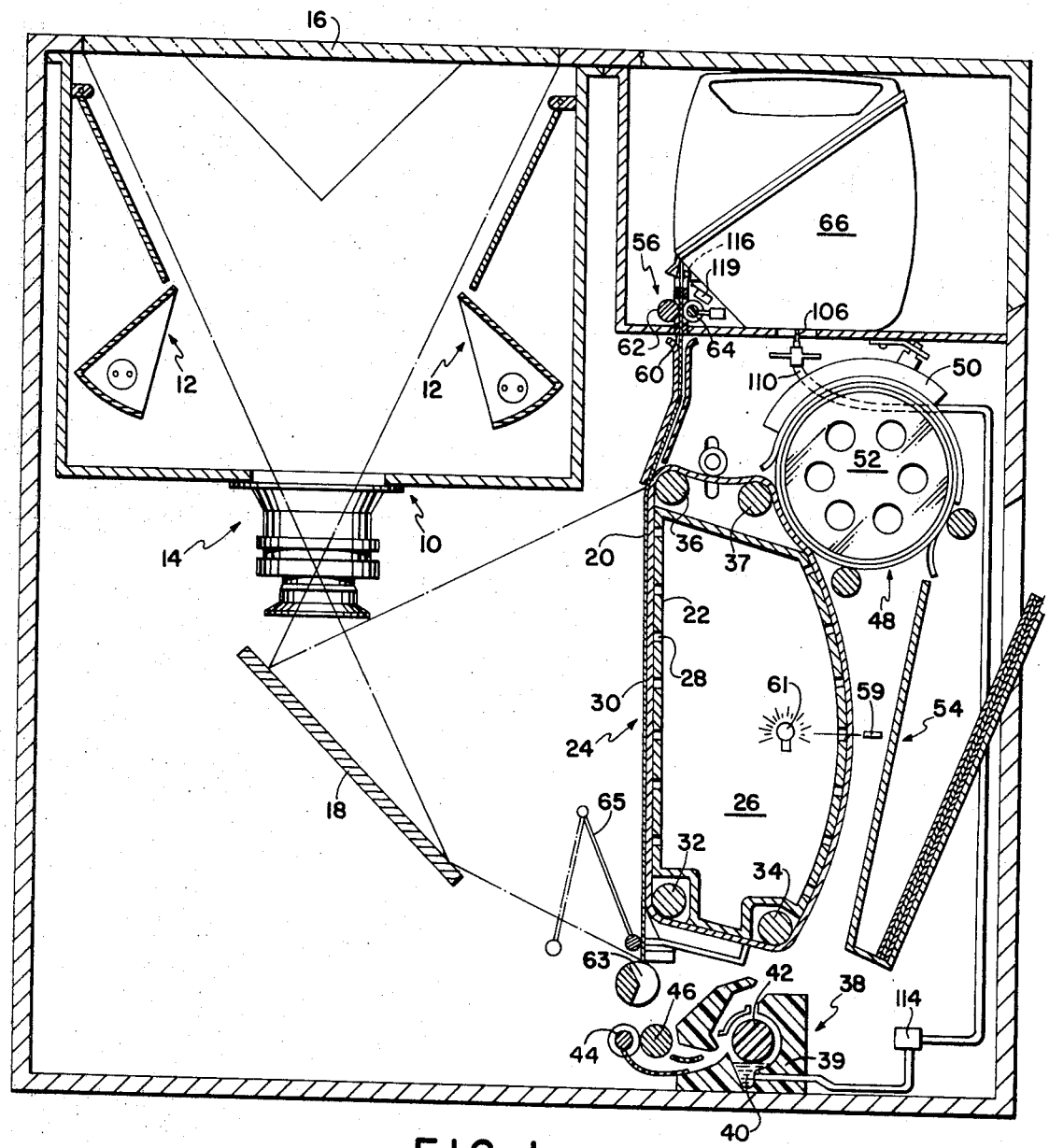
FIG. 1 is a sectional elevational view of photographic document copying apparatus showing a cassette embodying the invention in feeding position in the apparatus.

One embodiment of a photographic document copier for use in conjunction with the present invention is shown in FIG. 1 and described in detail in copending U.S. patent application Ser. No. 722,853, assigned to the same assignee as the present application. Generally, the copier includes an exposure system 10 including light source means 12, lens means 14 and a transparent window 16 upon which the original document to be copied is placed. The lens means 14 directs an image of the document to reflecting means 18 which direct the image to the photosensitive sheet material 20 which is held against platen 22 of the sheet material transport system 24. The transport system 24 includes a vacuum chamber 26 with openings 28 through the platen which serve to hold the sheet material 20 in a flat plane as it is transported by means of a perforated belt 30 driven by drive rollers 32, 34, 36 and 37.

A processing liquid applicator station 38 applies the processing liquid 40 contained in reservoir 39 to the sheet material by means of roller 42 as the sheet material passes thereover in its path of travel. Drive rollers 44 and 46 serve to drive the sheet material over roller 42 and back on to the belt 30. Finally the sheet material 20 is transported on to drum drying means 48 wherein a heated platen 50 applies heat to the material as it is driven around rotating drum 52 and into delivery station 54.

Feed means 56 are shown in FIG. 1 positioned in the cassette receiving chamber 58. The chamber has an opening 60 therein through which the sheet material 20 may be fed into the sheet transport system of the copier. The feed means 56 comprise a pair of rollers 62 and 64 of which at least one is driven and means are provided which move the rollers into engagement with the sheet material 20 as it leaves the cassette or container 66.

Cut off means are provided in the copier for severing each copy from the continuous processing sheet for delivery to the user. To accomplish this a photocell 59 is placed relative to a light source 61 within said transport system 24 so that the leading edge of the processing material interrupts the light beam from said light source completing a circuit to a solenoid, not shown, which actuates a knife 63 for severing said copy from the continuous sheet. A holddown means 65 holds the end portion of sheet material 20 in proper position for exposure as described in the aforementioned application Ser. No. 722,853.

The cassette or container which is shown in an exploded perspective view in FIG. 2 comprises a first section 68 and a second section 70 made of molded plastic material. A coil of recording sheet material wound around a core 71, as shown in FIG. 3, is received inside the cassette and the core 71 is received for rotation in curved portions 72 and 74 integrally molded into the first section 68 of the container. Mating portions 76 and 78 are provided in the second portion 70 of the container for similarly receiving the hub of the coiled sheet material. Portions 73 and 75 are integrally molded handles for gripping said cassette when placing it in the receiving chamber 58. The interior of the container is divided into compartments by means of the wall means 80 and 82 in the first section 68 and mating wall means 84 and 86 in the second section 70 of the container 66. The central compartment 87 is a light-tight chamber which contains the coil of recording material 20. Sealing material or other sealing means are provided on all mating portions of the first and second sections of the container 66 to provide a barrier between compartments and to the outside atmosphere and thus prolonging the useful life of the recording material inside. As the first and second sections of the container are sealed together, all light is also omitted from the inside, thus preventing any fogging of the sheet material which is photosensitive for use with the copier described. To provide for feeding the sheet material from the cassette or container 66 into the copier transport system, feed lip means 90 are provided integral with and extending from the cassette. The lip means 90 comprises a pair of lips 92 and 94 on the first and second sections 68 and 70, respectively, of the container. The pair of lips tend to protect the opening between them leading from the container from any light which may expose the photosensitive image-recording material inside. The end of sheet material 20 extends between the lips 92 and 94 and the plurality of aligned openings 96 and 98 therein allow feed rollers 62 and 64 of the copier to engage the sheet material and pull it from the cassette. The aligned openings in the pair of lip portions are an important aspect of the invention since it allows the end of the processing sheet to be contacted simultaneously by rollers 62 and 64 and be pulled into the bight between the rollers and out of the cassette.

FIG. 3 of the drawing is a front view of the container 66 showing the coil of sheet material 20 inside, shown in dotted lines, and the end of the material extending between the feed lips 92 and 94. FIG. 4 of the drawing shows a left side elevation of the container and the feed rollers 62 and 64 of the copier in driving contact with the sheet material 20. Positioning the feed lips 92 and 94 between the rollers also serves to properly align the container 66 within the receiving chamber 58. The end of the coil of recording material 20 is also simply and automatically guided into proper feeding position merely by inserting the feed lips between the rollers 62 and 64. The roller 62 in this example is driven against idler roller 64 and roller 64 may be moved into and out of driving contact with the sheet material by solenoid actuated means 95 as shown by the double headed arrow 96. Of course, both rollers 62 and 64 could be driven, if desired, or roller 64 could be the driven roller and roller 62 the idler. It should also be apparent that instead of an idler roller a nonrotatable bearing surface which may be curved, for example, could be used opposite a driven roller for engaging the processing material 20 between them. Also shown in FIG. 4 and FIG. 3 are processing liquid supplying means which comprise a collapsible liquid containing receptacle 98 which is received in compartment 100 of the container 66. The receptacle 98 is preferably a collapsible bag made so that as it is emptied of liquid 40 the atmospheric pressure collapses the bag preventing a vacuum from forming inside to restrict the flow of liquid therefrom. If the receptacle for the fluid is not collapsible it may be vented to allow air to enter and equalize the pressure inside and outside the receptacle. A spout 102 is positioned in an opening in receptacle 98 and a closure such as a self-sealing elastomeric stopper 104 seals the liquid in the receptacle. When the receptacle is placed in compartment 100 the spout 102 is inserted through opening 105 in the compartment wall. A hollow needle 106 which is external to the cassette and mounted on the copier punctures the stopper 104 as the container 66 is positioned in its feeding position in the receiving chamber 58. The needle 106 is shown as puncturing the stopper and the fluid 40 flows through the needle into the tubing 110 which carries it to the liquid reservoir shown as part of the liquid supplying system 38 in the copier in FIG. 1. A control valve 114 in system 38 controls the amount of liquid allowed to flow into reservoir 39. If the container 66 is removed from its feeding position the self-sealing stopper will seal the fluid in receptacle 98 until ready again for use. If the compartment formed by the interior wall portions is properly sealed, a vapor transmission barrier will exist between compartment 100 and the rest of the cassette interior thus allowing the collapsible receptacle 98 to be formed of any plastic material such as polyethylene so long as it is strong enough not to break if the cassette is dropped, for example. However, if the compartment seal is not perfect, it may be desirable to laminate a metal foil vapor transmission barrier into the wall portion of the receptacle 98 or surround the receptacle with such a foil barrier. To further insure against breakage of the receptacle, it may also be surrounded by a metal or cardboard box within the compartment 100.

Also shown in FIGS. 4 and 5 is a braking means for locking the end of the sheet material 20 in place between the feeding lips during shipping or storage, for example. This braking means comprises a thin rubber roll 116 which fits into a groove 118 molded as an integral portion of lip 92 as shown. The rubber roller 116 presses the end of the sheet material 20 against the opposing lip 94 clamping it in place. The position of the roller 116 just in front of the opening from the container 66 leading between the lips 92 and 94 is such that it acts as a light seal to prevent any light which may enter between the lips from penetrating into the container interior and prematurely exposing the photosensitive sheet material 20. To unlock the end of the sheet material a hinged flap 120 is provided generally opposite roller 116 with flap actuating means 122 and 124 shown in FIG. 2 whereby the flap is deformable away from the lip 92 substantially relieving the clamping forces holding the end of the sheet material against the roller 116. Flap actuating means 122 and 124 may either be manually grasped for opening the flap or a camming means inside the copier chamber may slide under the actuating means upon insertion of the feed lips between the feed rollers and cam the flap open automatically. When the container 66 is removed from the chamber 58 the flap 120 may be returned to its closed position again locking the end of the sheet material in place. While still in feeding position it is also desiarble to lock the end of the material 20 between the lips when it is not being fed therethrough and for this purpose a pad 119 as shown in FIG. 4 may be actuated to pivot into place to press the material 20 against idler roller 64 when driven roller 62 is withdrawn.

Core locking means 122 are also provided, as shown in FIGS. 5 and 6, for preventing the core 71 of the coiled material from rotating inside the cassette or container during shipment, for example. The locking means comprise one or more locking members 126, one of which is shown in FIG. 6 attached to the inside of core 71. The locking member 126 extends into the compartment 128 which is formed by mating wall portion 82 and 86 which receive the core 71 for rotation. As shown in FIG. 5 the wall 82 has a notch 130 formed therein in which locking member 126 is seated in locking position. An opening 132 is provided in the container wall into which a seating member 134 may extend when the container is properly positioned in chamber 58 as shown in FIG. 6. The member 134 has a camming surface 136 thereon which contacts a portion 138 of locking member 126 to raise said member out of notch 130 as shown in dotted line in FIG. 6, allowing the core to rotate with the member 126. So long as the camming surface 136 is in position the locking member 126 will ride over notch 130 but if the camming surface is removed it will again lock the core by dropping into notch 130. The opening through which camming surface 136 extends while contacting portion 138 of locking member 126 may be sealed with a thin plastic light barrier for shipping, the barrier being broken as the container 66 is seated on seating member 134.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:
   a container providing a lighttight chamber;
   a coil of photosensitive, image-recording sheet material coiled within said lighttight chamber;
   an opening in said container through which said sheet material may move;
   a pair of lips extending from said container closely adjacent opposite sides of said opening in opposition to one another along the length of said opening in said container to provide a passage between said lips through which said sheet material may leave said container;
   each of said lips having a plurality of openings therein spaced along the length of said container opening, said openings in each of said lips being aligned with openings in the opposite lip to permit external drive means to engage said sheet material through said openings in both of said lips for driving said sheet material from said container.

2. Photographic apparatus for containing a coil of photographic sheet material, said apparatus comprising:
   a container;
   a relatively narrow opening in said container through which sheet material coiled within said container is movable from said container;
   a lip extending from said container along the length of said opening closely adjacent at least one side of said opening and providing a guide for supporting said sheet material as the material is withdrawn from said container through said opening; and
   a second lip extending from said container along the length of said opening adjacent the other side of said opening;
   said lips opposing one another along the length of said opening in said container and cooperating to provide a passage therebetween through which said material may be withdrawn from said container;
   each of said lips having a plurality of openings therein spaced along the length of said container opening, said opening in each of said lips being aligned with an opening in the opposite lip to permit external drive means to engage said sheet material through said openings in both of said lips for driving said sheet material from said container.

3. Photographic apparatus comprising:
   a container providing a lighttight chamber;
   a coil of photosensitive, image-recording sheet material coiled within said lighttight chamber;
   an opening in said container through which said sheet material may move;
   a pair of lips extending from said container closely adjacent opposite sides of said opening and providing a passage therebetween through which said sheet material may leave the container, each of said lips having at least one opening therein through which external drive means may engage said sheet material for driving said material from said container; and
   a receptacle holding processing fluid supported within said container, said container being formed with an opening to provide access to said receptacle by external means for withdrawing said fluid from said receptacle.

4. Photographic apparatus for containing a coil of photographic sheet material, said apparatus comprising:
   a container;
   a relatively narrow opening in said container through which sheet material coiled within said container is movable from said container;
   a lip extending from said container along the length of said opening closely adjacent at least one side of said opening and providing a guide for supporting said sheet material as the material is withdrawn from said container through said opening, said lip having at least one opening therein through which external drive means may engage said sheet material for driving said material from said container; and
   a receptacle containing processing liquid, supported within said apparatus; said apparatus being formed with an opening providing access to said receptacle by external means adapted to withdraw said liquid from said receptacle.

5. Photographic apparatus as described in claim 4 including braking means engaged with an end portion of said sheet material between said lips for preventing said end portion from moving inwardly into said container.

6. Photographic apparatus as described in claim 5 wherein said braking means comprise a recess in at least one of said lips and a locking element mounted in said recess in frictional engagement with said end portion of said sheet material for clamping said end portion thereof against the other of said lips.

7. Photographic apparatus as described in claim 6 wherein said other lip includes a section positioned opposite said clamping element deformable away from said clamping element to relieve the clamping forces on said end portion of said sheet material.

8. Photographic apparatus comprising:
   a container providing a lighttight chamber;
   a coil of photosensitive, image-recording sheet material coiled within said lighttight chamber;
   an opening in said container through which said sheet material may move;
   a pair of lips extending from said container closely adjacent opposite sides of said opening and providing a passage therebetween through which said sheet material may leave the container, each of said lips having at least one opening therein through which external drive means may engage said sheet material for driving said material from said container;
   a core around which said photographic material is coiled;
   support means for rotatably supporting said core; and
   means for releasably locking said core against rotation.

9. Photographic apparatus as described in claim 8 wherein said means for releasably locking said core comprise a locking member extending from said core and rotatable therewith, a notch on a wall portion of said container which receives said locking member holding said locking member and said core against movement, and an opening in said container through which a camming member may enter said container to cam said locking member out of engagement with said notch.

10. Photographic apparatus for containing a coil of photographic sheet material, said apparatus comprising:
   a container;
   a relatively narrow opening in said container through which sheet material coiled within said container is movable from said container;
   a lip extending from said container along the length of said opening closely adjacent at least one side of said opening and providing a guide for supporting said sheet material as the material is withdrawn from said container through said opening, said lip having at least one opening therein through which external drive means may engage said sheet material for driving said material from said container;
   a core and support means for rotatably supporting said core, said photographic material being coiled around said core; and
   means for releasably locking said core against rotation.

11. Photographic apparatus as described in claim 10 wherein said means for releasably locking said core comprise a locking member extending from said core and rotatable therewith, a notch on a wall portion of said container which receives said locking member holding said locking member and said core against movement, and an opening in said container through which a camming member may enter said container to cam said locking member out of engagement with said notch.

12. Photographic apparatus comprising:
   a container providing a lighttight chamber;
   a coil of photosensitive, image-recording sheet material coiled within said lighttight chamber;
   an opening in said container through which said sheet material may move;
   a pair of lips extending from said container closely adjacent opposite sides of said opening and providing a passage therebetween through which said sheet material may leave said container, each of said lips having at least one opening therein through which external drive means may engage said sheet material for driving said material from said container; and
   braking means engaged with an end portion of said sheet material between said lips for preventing said end portion from moving inwardly into said container.

13. Photographic apparatus as described in claim 12 wherein said braking means comprise a recess in at least one of said lips and a locking element mounted in said recess in frictional engagement with said end portion of said sheet material for clamping said end portion thereof against the other of said lips.

14. Photographic apparatus as described in claim 13 wherein said other lip includes a section positioned opposite said clamping element deformable away from said clamping element to relieve the clamping forces on said end portion of said sheet material.

References Cited

UNITED STATES PATENTS

| | | | |
|---|---|---|---|
| 2,419,474 | 4/1947 | Wilcox | 95—11 |
| 2,591,417 | 4/1952 | Frye | 95—31 |
| 2,731,894 | 1/1956 | Leitz et al. | 95—31 |
| 3,278,252 | 10/1966 | Wagner et al. | 352—78X |
| 3,392,649 | 7/1968 | Ruehle | 95—31 |
| 3,402,982 | 9/1968 | Lemelson | 352—72X |

JOHN M. HORAN, Primary Examiner

K. C. HUTCHISON, Assistant Examiner